United States Patent

Todd et al.

(10) Patent No.: US 10,841,079 B1
(45) Date of Patent: Nov. 17, 2020

(54) DATA REGISTRATION-AWARE STORAGE SYSTEMS

(71) Applicant: EMC IP Holding Company LLC, Hopkinton, MA (US)

(72) Inventors: Stephen Todd, Shrewsbury, MA (US); Mark A. O'Connell, Westborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 182 days.

(21) Appl. No.: 15/660,411

(22) Filed: Jul. 26, 2017

(51) Int. Cl.
  *H04L 29/06* (2006.01)
  *H04L 9/06* (2006.01)
  *H04L 9/32* (2006.01)
  *G06F 21/64* (2013.01)
  *G06F 16/435* (2019.01)

(52) U.S. Cl.
  CPC .......... *H04L 9/0637* (2013.01); *G06F 16/435* (2019.01); *G06F 21/645* (2013.01); *H04L 9/3265* (2013.01); *H04L 63/123* (2013.01); *G06F 2221/031* (2013.01); *G06F 2221/032* (2013.01)

(58) Field of Classification Search
  CPC ... H04L 9/0637; H04L 9/3265; H04L 63/123; G06F 16/435
  See application file for complete search history.

(56) References Cited

U.S. PATENT DOCUMENTS

| | | | | |
|---|---|---|---|---|
| 9,635,000 B1* | 4/2017 | Muftic | ................ | H04L 63/0435 |
| 10,178,083 B2* | 1/2019 | Resch | ................ | H04L 63/0823 |
| 2002/0087544 A1* | 7/2002 | Selkirk | ................ | G06F 3/0608 |
| 2009/0300710 A1* | 12/2009 | Chai | ................ | G06F 21/6218 |
| | | | | 726/1 |
| 2012/0047568 A1* | 2/2012 | Keng | ................ | G06F 9/54 |
| | | | | 726/9 |
| 2014/0164776 A1* | 6/2014 | Hook | ................ | H04L 9/14 |
| | | | | 713/171 |
| 2016/0012696 A1* | 1/2016 | Robinton | ........... | G06Q 10/0833 |
| | | | | 340/572.1 |
| 2016/0044035 A1* | 2/2016 | Huang | ................ | H04L 63/0272 |
| | | | | 726/4 |
| 2017/0041296 A1* | 2/2017 | Ford | ................ | G06F 16/951 |
| 2018/0004972 A1* | 1/2018 | Ruggiero | ............ | G06F 21/6245 |

(Continued)

OTHER PUBLICATIONS

M. Ali et al., "Blockstack: A Global Naming and Storage System Secured by Blockchains," Proceedings of the USENIX Annual Technical Conference (USENIX ATC), Jun. 22-24, 2016, pp. 181-194.

(Continued)

*Primary Examiner* — Fatoumata Traore
*Assistant Examiner* — Michael M Lee
(74) *Attorney, Agent, or Firm* — Ryan, Mason & Lewis, LLP

(57) ABSTRACT

One or more data storage systems are configured to automatically access a data registration service in response to receipt of a data request associated with a storage user of the one or more data storage systems and a profile of an identity associated with the storage user. The identity profile associated with the storage user comprises one or more policies for storage and access of data associated with the storage user.

20 Claims, 7 Drawing Sheets

(56) References Cited

U.S. PATENT DOCUMENTS

2018/0285996 A1* 10/2018 Ma ..................... G06Q 50/184
2018/0300688 A1* 10/2018 Ishida .................... G06F 12/00

OTHER PUBLICATIONS

M. Ali et al., "Blockstack: A New Decentralized Internet," https://blockstack.org, Whitepaper Version 1.0.1, May 16, 2017, 22 pages.
Wikipedia, "Blockstack," https://en.wikipedia.org/wiki/Blockstack, May 28, 2017, 2 pages.
Satoshi Nakamoto, "Bitcoin: A Peer-to-Peer Electronic Cash System," Whitpaper, https://bitcoin.org/bitcoin.pdf, Nov. 2008, 9 pages.

* cited by examiner

100

200

300

400

500

800

DATA REGISTRATION-AWARE STORAGE SYSTEMS

FIELD

The field relates generally to data storage systems, and more particularly to techniques for managing content in such data storage systems.

BACKGROUND

There are many reasons why a creator, editor, or otherwise an owner, of a data set (e.g., electronic document, manuscript, etc.) would want the digital content of the data set to be certified or verified. For example, the creator/editor/owner may want or need to prove authenticity, integrity, accuracy, existence, and/or ownership of the document. There are available services that attempt to provide one or more of these features through the use of blockchain technology, e.g., BlockSign from Basno Inc. of New York, N.Y. or Stampery from Stampery Inc. of Madrid, Spain. However, there are limitations associated with the use of these existing data registration services especially for users of data storage systems.

SUMMARY

Embodiments of the invention provide data registration-aware storage systems and methods.

For example, in one embodiment, a method comprises the following steps. One or more data storage systems are configured to automatically access a data registration service in response to receipt of a data request associated with a storage user of the one or more data storage systems and a profile of an identity associated with the storage user. The identity profile associated with the storage user comprises one or more policies for storage and access of data associated with the storage user.

By way of further example, in one embodiment, a method comprises the following steps. A data request associated with a storage user is received at a data registration-aware storage system. The data request is processed at the data registration-aware storage system in accordance with a profile of an identity associated with the storage user. The processing comprises automatically accessing a data registration service in accordance with one or more policies for storage and access of data specified in the profile.

Additional embodiments perform one or more of the above steps in accordance with an apparatus comprising a processor and memory, and in accordance with an article of manufacture or computer program product.

Advantageously, illustrative embodiments utilize data registration-aware storage systems to automatically integrate data registration services with a storage user's identity profile.

These and other features and advantages of the invention will become more readily apparent from the accompanying drawings and the following detailed description.

DETAILED DESCRIPTION

Figure 1:
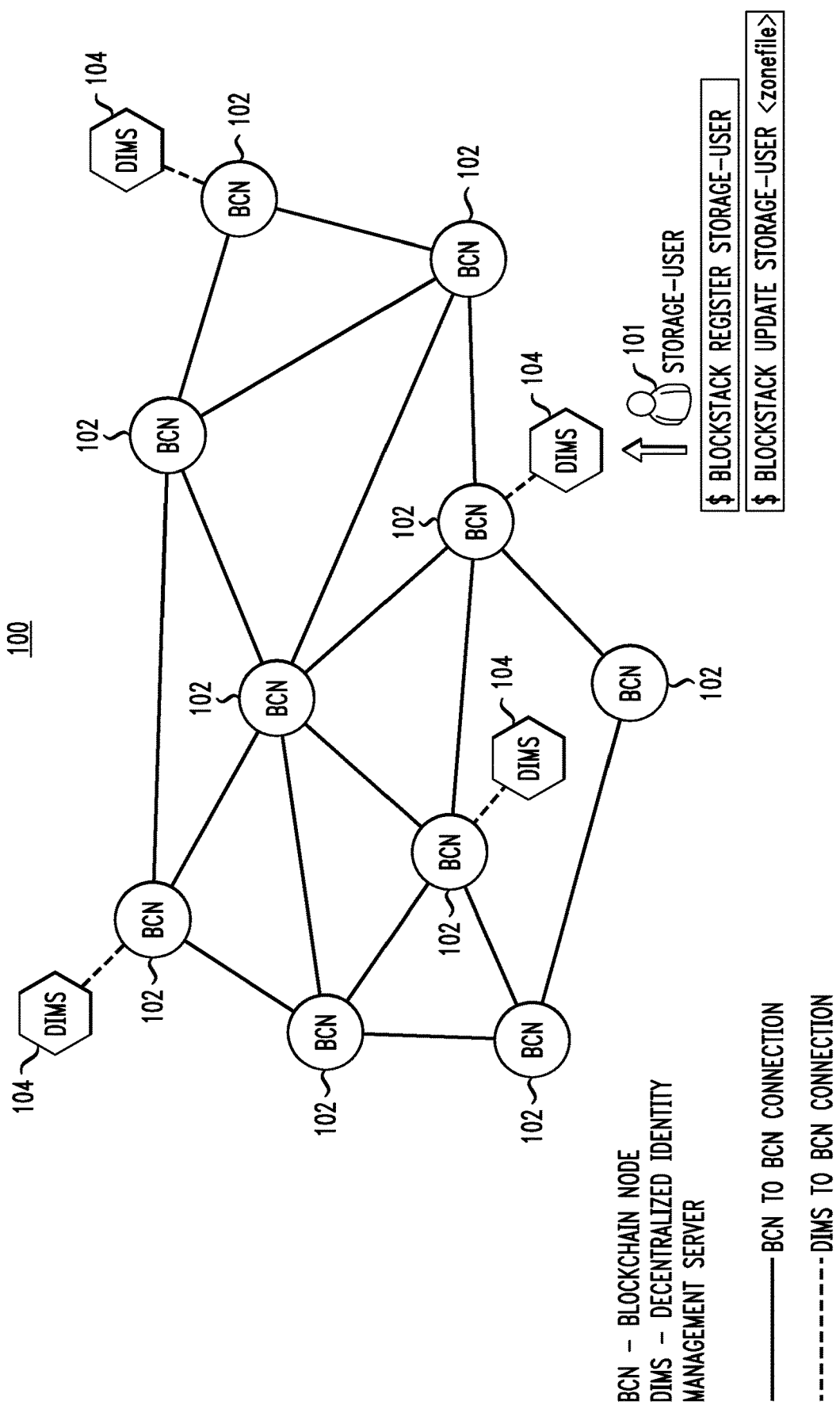
FIG. 1 illustrates a decentralized identity management system with which one or more embodiments are implemented.

Illustrative embodiments will be described herein with reference to exemplary information processing systems comprising data storage systems and associated host devices, storage devices and other processing devices. It is to be appreciated, however, that embodiments are not restricted to use with the particular illustrative system and device configurations shown. Accordingly, the terms "information processing system" and "data storage system" (or "storage system") as illustratively used herein are intended to be broadly construed, so as to encompass, for example, processing systems comprising cloud computing and storage systems, as well as other types of processing systems comprising various combinations of physical and virtual processing resources. An information processing system may therefore comprise, for example, a cloud infrastructure hosting multiple tenants that share cloud resources including storage resources in a data storage system. Such systems are considered examples of what are more generally referred to herein as cloud computing environments. Some cloud infrastructures are within the exclusive control and management of a given enterprise, and therefore are considered "private clouds." The term "enterprise" as used herein is intended to be broadly construed, and may comprise, for example, a business or any other entity, group, or organization. An "entity" as illustratively used herein may be a person or system. On the other hand, cloud infrastructures that are used by multiple enterprises, and not necessarily controlled or managed by any of the multiple enterprises but rather are respectively controlled and managed by third-party cloud providers, are typically considered "public clouds." Thus, enterprises can choose to host their applications or services on private clouds, public clouds, and/or a combination of private and public clouds (hybrid clouds). However, data storage systems described herein are not intended to be limited to cloud computing environments and thus may be implemented without cloud infrastructure or with some combination of cloud and non-cloud infrastructure.

As mentioned above, techniques have emerged for registering specific pieces of content with specific users. One way to provide an association between the content and a specific user is through the use of a decentralized identity.

Decentralized identities are fully created, owned, and managed by the users themselves (as opposed to the centralized identities being managed by private corporations and/or public cloud providers). One such decentralized identity management system is Blockstack. Blockstack is described in detail, for example, in M. Ali et al., "Blockstack: A Global Naming and Storage System Secured by Blockchains," Proceedings of the 2016 USENIX Annual Technical Conference, p. 181-194, June 2016, the disclosure of which is incorporated by reference herein in its entirety. However, it is to be appreciated that embodiments are not limited to using Blockstack as a decentralized identity management system, and thus embodiments are more generally applicable to any other suitable, non-Blockstack based, decentralized identity management system.

In general, Blockstack uses a blockchain to bind a digital property, such as a name, to a given value. Immutability and therefore trust are provided in a decentralized manner by allowing for any new node in the system to independently verify data bindings through the blockchain. More particularly, a Blockstack architecture has four layers, two in the control plane and two in the data plane. The control plane includes a blockchain layer and a virtualchain layer. The data plane includes a routing layer and a data storage layer.

The blockchain layer is the bottommost functional layer, and serves to store the Blockstack operations (encoded in transactions on the blockchain distributed ledger) and to provide consensus on the order in which the Blockstack operations were written. Blockstack operations typically include name registrations, updates, and transfers.

The virtualchain layer is functionally implemented above the blockchain layer. The virtualchain layer is configured to define new Blockstack operations without changing any data on the blockchain layer. The logic for accepting or rejecting new Blockstack operations is contained in the virtualchain layer.

Above the control plane (blockchain layer and virtualchain layer), the data plane separates the function of routing requests (routing layer) from the function of storing data (data storage layer). More particularly, Blockstack uses zone files (having the same format as a zone file of a domain name service (DNS)) for routing information. The virtualchain layer binds names to respective hashes of the zone files and stores these bindings in the control plane. However, the zone files themselves are stored in the routing layer. The integrity of a given zone file is verified by verifying the hash of the given zone file in the control plane.

The data storage layer is the topmost functional layer in the Blockstack architecture. The actual data values of the name-value pairs are stored in the data storage layer, and are signed by the cryptographic key of the owner of the name. The integrity of a given data value can be verified in the control plane.

Accordingly, the Blockstack architecture uses these four functional layers to implement a naming system. Names are owned by cryptographic addresses of the underlying blockchain layer and their associated private keys. A user claims a name by being the first to perform a successful preorder and register operation for the name. Once a name is registered, a user can update the name-value pair. This is done by initiating an update operation and uploading the new value to the routing layer so as to change the name-value binding. The address that is allowed to sign subsequent transactions can be changed by a name transfer operation. Further details about the Blockstack architecture can be found, for example, in the above-referenced M. Ali et al. paper.

It is to be further understood that, in an illustrative Blockstack architecture, while the blockchain layer is maintained across a first set of distributed compute nodes, the other layers of the Blockstack architecture are maintained across a second set of distributed compute nodes which are in communication with one or more of the blockchain compute nodes.

As used herein, the terms "blockchain," "digital ledger" and "blockchain digital ledger" may be used interchangeably. As is known, the blockchain or digital ledger protocol is implemented via a distributed, decentralized computer network of compute nodes. The compute nodes are operatively coupled in a peer-to-peer communications protocol. In the computer network, each compute node is configured to maintain a blockchain which is a cryptographically secured record or ledger of data blocks that represent respective transactions within a given computational environment. The blockchain is secured through use of a cryptographic hash function. A cryptographic hash function is a cryptographic function which takes an input (or "message") and returns a fixed-size alphanumeric string, which is called the hash value (also a message digest, a digital fingerprint, a digest, or a checksum). Each blockchain is thus a growing list of data records hardened against tampering and revision, and typically includes a timestamp, current transaction data, and information linking it to a previous block. More particularly, each subsequent block in the blockchain is a data block that includes a given transaction(s) and a hash value of the previous block in the chain, i.e., the previous transaction. That is, each block is typically a group of transactions. Thus, advantageously, each data block in the blockchain represents a given set of transaction data plus a set of all previous transaction data. In the Blockstack context, examples of transactions can be operations of preordering a new name-value pair, registering a new name-value pair, and changing an existing name-value pair.

In the case of a "bitcoin" implementation of a blockchain distributed ledger, the blockchain contains a record of all previous transactions that have occurred in the bitcoin network. The bitcoin system was first described in S. Nakamoto, "Bitcoin: A Peer to Peer Electronic Cash System," 2008, the disclosure of which is incorporated by reference herein in its entirety.

A key principle of the blockchain is that it is trusted. That is, it is critical to know that data in the blockchain has not been tampered with by any of the compute nodes in the computer network (or any other node or party). For this reason, a cryptographic hash function is used. While such a hash function is relatively easy to compute for a large data set, each resulting hash value is unique such that if one item of data in the blockchain is altered, the hash value changes. However, it is realized that given the constant generation of new transactions and the need for large scale computation of hash values to add the new transactions to the blockchain, the blockchain protocol rewards compute nodes that provide the computational service of calculating a new hash value. In the case of a Bitcoin network, a predetermined number of bitcoins are awarded for a predetermined amount of computation. The compute nodes thus compete for bitcoins by performing computations to generate a hash value that satisfies the blockchain protocol. Such compute nodes are referred to as "miners." Performance of the computation of a hash value that satisfies the blockchain protocol is called "proof of work." While bitcoins are one type of reward, blockchain protocols can award other measures of value (monetary or otherwise) to successful miners.

It is to be appreciated that the above description represents an illustrative implementation of the blockchain protocol in a Blockstack naming system and that embodiments of the invention are not limited to the above or any particular blockchain protocol or naming system implementation. As such, other appropriate processes may be used to securely maintain and add to a set of data in accordance with embodiments of the invention. For example, distributed ledgers such as, but not limited to, R3 Corda, Ethereum, and Hyperledger may be employed in alternative embodiments.

Accordingly, in a Blockstack naming system, one or more compute nodes allow for identities to be created by registering a name and then associating identity information with that name (e.g., as described above, a reference pointer in the blockchain points to a given zone file, and the given zone file ultimately points to information about the user's identity).

For example, assume that an identity for an employee of a company is created by the company using an identification badge number of the employee. The company keeps the private key for that identity and the Blockstack naming system accepts the identity in a two-phase commit ("preorder" command followed by "register" command) where the public key can verify the private key being used by the company. In a similar way, an individual or other entity can create an identity himself (using the two-phase commit) that has its own private key, thus creating a decentralized identity that is fully owned and managed by the individual or other entity. The identity is "remembered" across every node in the bitcoin ledger due to Blockstack's use of a private scratchpad location in a bitcoin transaction. The replication of each bitcoin transaction into a decentralized blockchain results in a public decentralized identity registry.

As used illustratively herein, the term "authentication" refers to a process of validating that an individual or entity is who the individual or entity purports to be. The term "authorization," as illustratively used herein, refers to a process of giving a person access to certain protected items, locations, and the like. However, it is to be appreciated that terms such as authenticate, authorize, validate, and the like, may be used interchangeably without limiting the scope of the embodiments.

FIG. 1 illustrates a decentralized identity management system 100. While one storage-user 101 is shown performing register and update operations with respect to system 100, it is to be understood that multiple storage-users may communicate and interact with system 100 creating their own decentralized identities.

As further shown, system 100 comprises a first set of compute nodes referred to as blockchain nodes (BCN) 102. Each BCN 102 is operatively coupled to one or more other BCN nodes 102 via a communication connection (as part of a communications network). The system 100 also comprises a second set of compute nodes referred to as decentralized identity management servers (DIMS) 104. In one embodiment, the DIMSs are Blockstack nodes. Each DIMS 104 is operatively coupled to at least one BCN 102 via a communication connection (as part of a communications network). Each DIMS may also be connected to one or more other DIMS. The BCN nodes 102 form a blockchain ledger while the DIMS nodes 104 form the naming system in conjunction with the underlying blockchain distributed ledger. In a Blockstack implementation, the DIMS nodes 104 form what is referred to as the virtualchain layer which logically resides on top of a bitcoin network formed by BCN nodes 102. The routing layer and data storage layer can be part of the DIMS nodes 104, or they can be implemented on different nodes.

Given the configuration of system 100, assume that a person or entity wishes to register an identity with system 100 as "storage-user" that will be used to access one or more storage systems, e.g., private clouds, public clouds and/or hybrid clouds. As shown, the person registers the identity with the decentralized identity management system 100. The person can update the identity as well using the update operation.

The identity and one or more attributes associated with the identity are defined in a profile record (e.g., a token file or token) cryptographically signed by the person. In the context of a Blockstack adaptation, a reference pointer to a zone file is stored in the blockchain, and then the zone file contains a reference pointer to one or more cryptographically signed token files. Thus, advantageously, the blockchain distributed ledger (e.g., at the blockchain layer) references the cryptographically signed token file (e.g., stored at the data storage layer). The referencing, in this illustrative embodiment, is provided by pointers that provide the connection from the blockchain layer, through the virtualchain layer and the routing layer, to the data storage layer.

More particularly, FIG. 1 highlights a user ("storage-user") informing Blockstack to register and create a fully-owned identity. Note that the identity refers to a zone file. Note also that the zone file, as mentioned above, points to the storage-user's profile record (e.g., token file or token). This token file, as will be explained further below, can contain information that storage-user 101 wishes to reveal.

Figure 2:
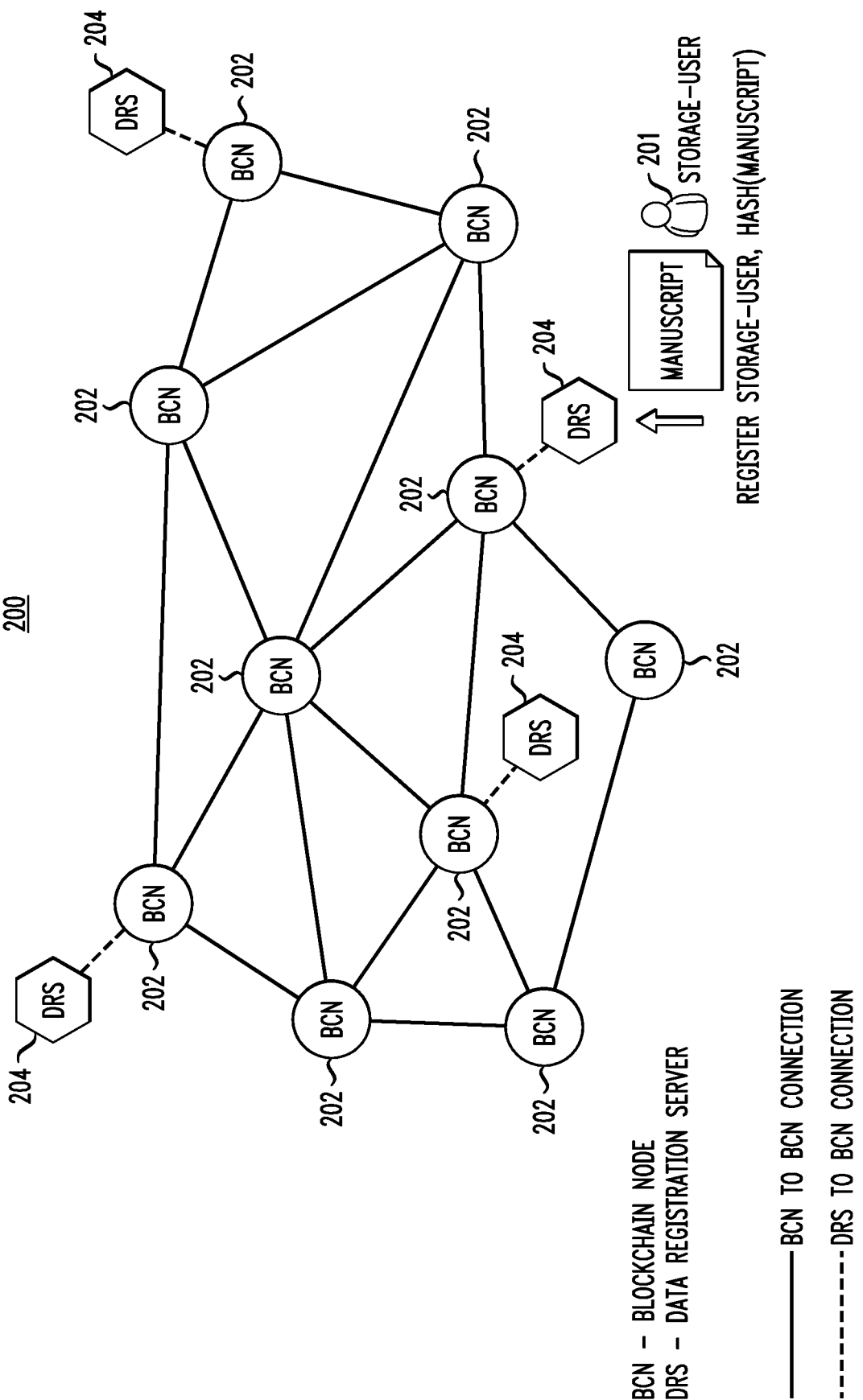
FIG. 2 illustrates a data registration system with which one or more embodiments are implemented.

Furthermore, data registration techniques allow a storage-user to associate specific pieces of content with their identity. FIG. 2 illustrates the association of a manuscript written by a storage-user with the storage-user's identity. More particularly, FIG. 2 illustrates a data registration system 200 according to an illustrative embodiment. While one storage-user 201 is shown performing data registration with respect to system 200, it is to be understood that multiple storage-users may communicate and interact with system 200 to register content.

As further shown, system 200 comprises a first set of compute nodes referred to as blockchain nodes (BCN) 202. Each BCN 202 is operatively coupled to one or more other BCN nodes 202 via a communication connection (as part of a communications network). The system 200 also comprises a second set of compute nodes referred to as data registration servers (DRS) 204. In one embodiment, the DRSs can be configured to provide one or more of document registration services (for example, but not limited to, Stampery and BlockSign). Each DRS 204 is operatively coupled to at least one BCN 202 via a communication connection (as part of a communications network). Each DRS may also be connected to one or more other DRSs. The BCN nodes 202 form a blockchain ledger while the DRSs 204 form the data registration system in conjunction with the underlying blockchain distributed ledger. Accordingly, the data registration example in FIG. 2 depicts a public declaration that a document (manuscript) is associated on a public ledger with storage-user's identity. By using a distributed ledger such as blockchain or other such distributed ledger to implement the data registration service, the public declaration is trusted.

While this approach represents a potential way to publicly associate content with an identity, there are several shortcomings in terms of providing enhanced data registration features.

Examples of these shortcomings are described below. It is realized herein that there are many different use cases for data registration. One such use case is to use registration as a way to "sign off" on (or approve) a document. Another use case is to register one's self as an exclusive "content creator" and to track the chain of custody of that document through the course of permissioned reads of that content. Current data registration approaches are not capable of implementing "custody" or "lineage" after data registration. This lack of capability poses particular problems as outlined below.

When a user creates a piece of content for the first time (e.g., a finished manuscript), the hashed value of that content can be associated with the user (as illustrated in FIG. 2), but there is no way to tie the hash value to the actual content itself (e.g. where it was stored). The loss of this association has longer-term auditability disadvantages. If a timestamp in the data registration ledger provably matches the timestamp of the storage of the associated content, the user has stronger position in the case of data registration disputes.

Current data registration approaches contain no guarantees that the registered content cannot be edited (either intentionally or maliciously). The editing of the only existing piece of content that matches the data registration hash code could result in permanent loss of the originally registered content.

Even if immutability is used in a given storage system, permanent loss of registered content can occur if the content is deleted (either intentionally or maliciously). If the deletion is intended, there is no automated action to either eliminate or obviate the entry.

Current data registration systems do not have any capability to permanently store the chain of custody for registered content as authorized users are granted permission to access the content. Similarly, these systems also do not have any capability to track unauthorized access to registered content up and down the chain of custody.

Illustrative embodiments overcome the above and other limitations with regard to current data registration approaches by configuring data storage systems to be aware of and integrated with data registration services/systems. As illustratively used herein, such data storage systems are referred to as registration-aware storage systems or RAS systems.

Thus, according to illustrative embodiments, when an identity wishes to write newly-created content to a RAS system, the system advertises to the user that it supports registration awareness. This feature enables a user to automatically benefit from registration-aware capabilities for any/all content that they create.

Figure 3:
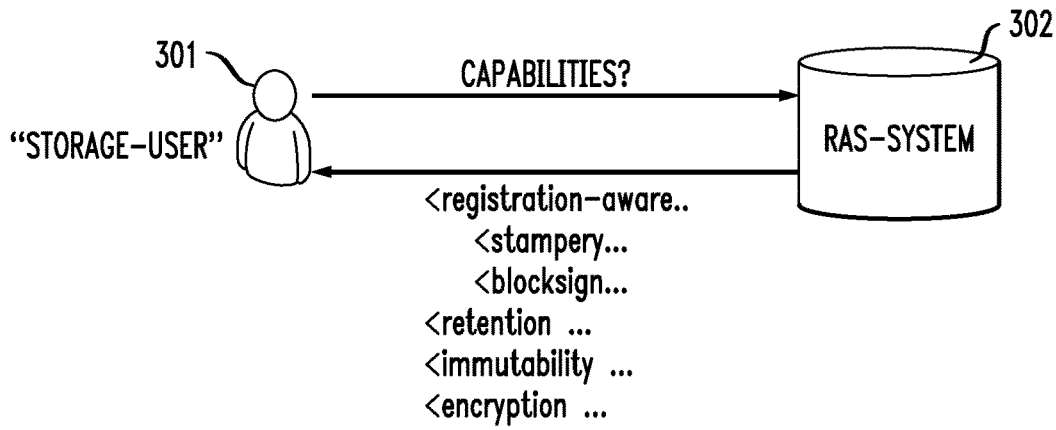
FIG. 3 illustrates a discovery process for registration-aware storage systems, according to an illustrative embodiment.

FIG. 3 illustrates a discovery process 300 according to an illustrative embodiment. Process 300 illustrates a protocol in which the registration-aware capabilities of RAS-System 302 are discovered and returned to "storage-user" 301. In this example, RAS-System 302 advertises its integration with different data registration systems (e.g., Stampery, BlockSign, etc.) and support for other storage trust-based features such as, but not limited to, retention, immutability, and encryption.

Once a user has identified the capabilities of RAS-System 302, they can insert policies into their identity profile (e.g., token file) that describe how and under what conditions these capabilities are invoked.

For example, storage-user 301 may wish that any video file stored to RAS-System 302 be non-editable and forever non-deletable. In addition, they may ask the storage system to take care of data registration automatically via, by way of example only, the Stampery protocol.

Similarly, it may also be specified in the storage-user's profile that for content containing certain metadata tags, greater than a certain size threshold, or classified by a certain structure (e.g., Extensible Markup Language), registration-aware actions must be taken by any RAS-System storing the content.

In addition, the storage-user's profile can be used to create a policy based on the directory that a file gets put into, e.g., any file that goes in a certain directory undergoes data registration. Thus, advantageously, if the storage user established his/her identity and thus profile with a centralized identity management system, e.g., Microsoft Windows-based Active Directory (AD), rather than a decentralized identity management system (e.g., a legacy application user), then such user can still leverage data registration-aware storage systems as disclosed herein.

Figure 4:
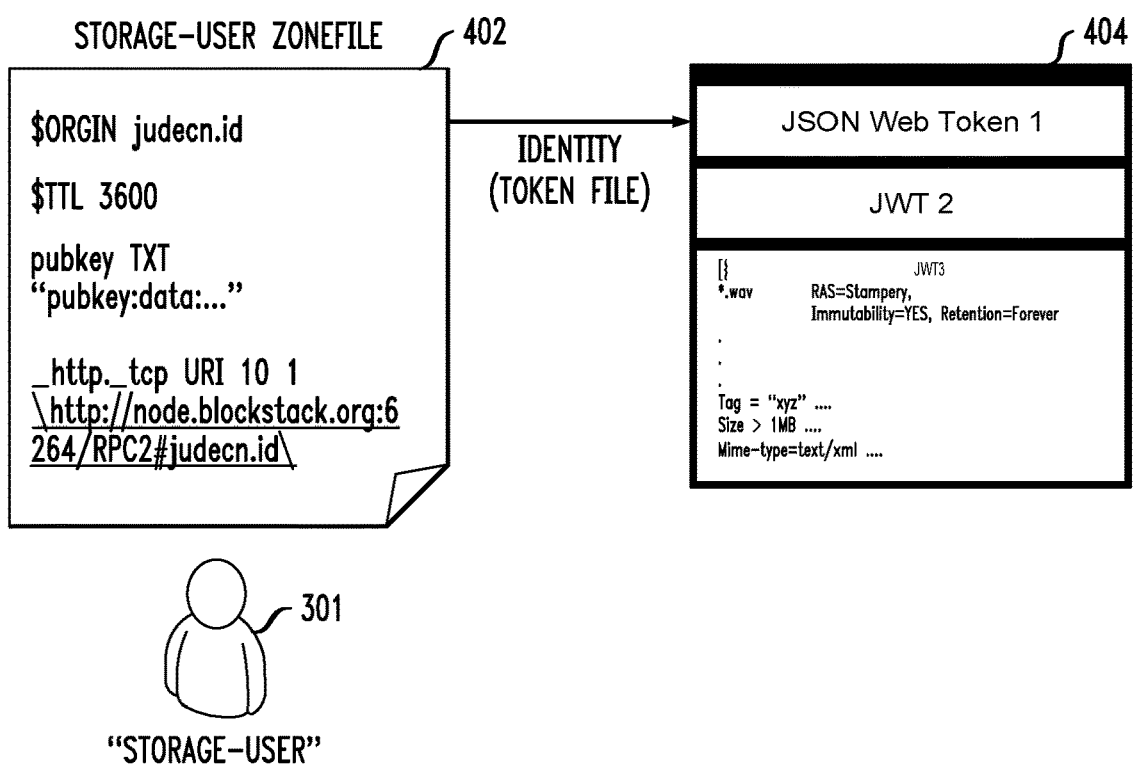
FIG. 4 illustrates a policy specification process for registration-aware storage systems, according to an illustrative embodiment.

FIG. 4 illustrates a policy specification process 400 according to an illustrative embodiment. As shown, the specification of these profiles may be made within the identity profile of storage-user 301. The example uses a Blockstack zone file 402 to point to storage-user's identity profile (e.g., token file) 404, as mentioned above. In this particular illustration, the token file is in the form of a JavaScript Object Notation (JSON) Web Tokens (JWTs).

When storage-user 301 proceeds to perform a write request to RAS-System 302, the system 302 atomically executes the write operation as well as performs the data registration step. Atomically linking these operations simplifies the user's experience and automatically carries out user wishes in terms of (for example) registering data that is guaranteed to be permanently stored.

Figure 5:
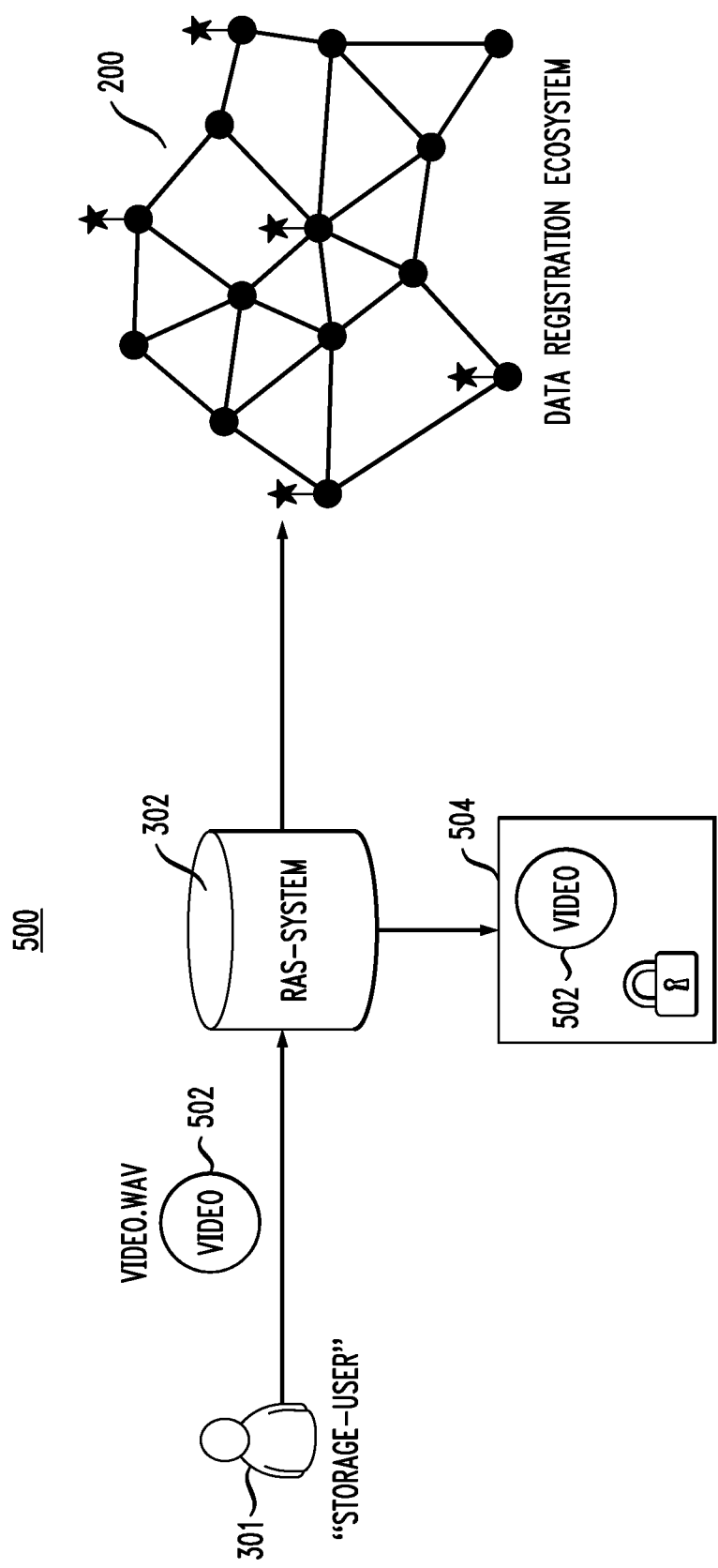
FIG. 5 illustrates a data registration function execution process for registration-aware storage systems, according to an illustrative embodiment.

FIG. 5 illustrates a process 500 for linking write operations with data registration function execution. More specifically, assume that storage-user 301 initiates a write operation from his client device to RAS-System 302 for video file 502. The RAS-System 302 accepts the request to write the video file 502. The RAS-System 302 parses the policies contained with the storage-user identity (token file 404) and selects a rule that protects the video with immutability and retention features, and also performs a data registration on behalf of the storage-user. RAS-System 302 automatically engages data registration ecosystem 200 (FIG. 2) to perform one or more data registration services (e.g., Stampery, BlockSign, etc.) on the video file 502. The video file 502 is immutably stored in storage location 504 of RAS-System 302.

Note that process 500 highlights an interaction between the RAS-System 302 and the data registration ecosystem 200. This process associates an identity (storage-user) with his or her content (e.g., the hash of video file 502). By "associate" as used herein with respect to a data registration service, it is meant that there is a correspondence established and recorded in a distributed ledger or some other trusted data structure. A secondary registration can also occur, in which the RAS-System 302 registers itself (e.g., via a digital signature based on RAS-System's private key) as well as the exact same hash of the content. This essentially begins a public chain of custody lineage map for the content created by storage-user. Process 500 thus comprises this "write-complete" registration.

As explained above, when a user stores data (e.g., storage user issues write request) to a data registration-aware storage system (e.g., RAS-System 302), the user's profile indicates that he/she desires the storage system to perform registration on his/her behalf. However, it is to be noted that the storage system does not have the private key of the identity. Therefore, in one or more illustrative embodiments, the RAS-System 302 can register the content by using its own private key and providing the following to the data registration ecosystem 200: the identity of the storage system (its own identity); the content address of the data being registered; and optionally the identity (name) of the originator (e.g., storage-user 301). This "transaction" will have a content address associated with it, and this can be returned to the user as a registration receipt. By adding the identity of the originator, a link is established between the data and the identity, with the storage system serving as a proxy for the data originator.

Still further, in one or more alternative embodiments, the original identity can prepare a "signed data registration" and include it as part of the write request. In this case, the storage system can simply pass this request on to the data registration ecosystem.

In a scenario where the registration fails (e.g., the data registration ecosystem 200 is unavailable), RAS-System 302 is configured with logic that can "undo" the write operation and return an error to the storage-user 301, or complete the write and return a "partial success" that the storage operation worked but the registration failed.

When a user wishes to perform a read request of a file (e.g., video file 502) that was stored using registration-aware techniques (FIG. 5), the RAS-System 302 consults the storage-user's profile (token file 404) to accept or reject the request. In one illustrative embodiment, the token file 404 contains permission attributes specified by the storage-user when his decentralized identity was created or modified in accordance with system 100 (FIG. 1). It is to be understood that the RAS-System 302 has access to the decentralized identity management system 100 (FIG. 1) in order to obtain the token file 404, or the token file 404 can be provided to RAS-System 302 in some alternative way.

Assume it is the desire of the user to trace the custody of video file 502. Illustrative embodiments provide several approaches.

Figure 6:
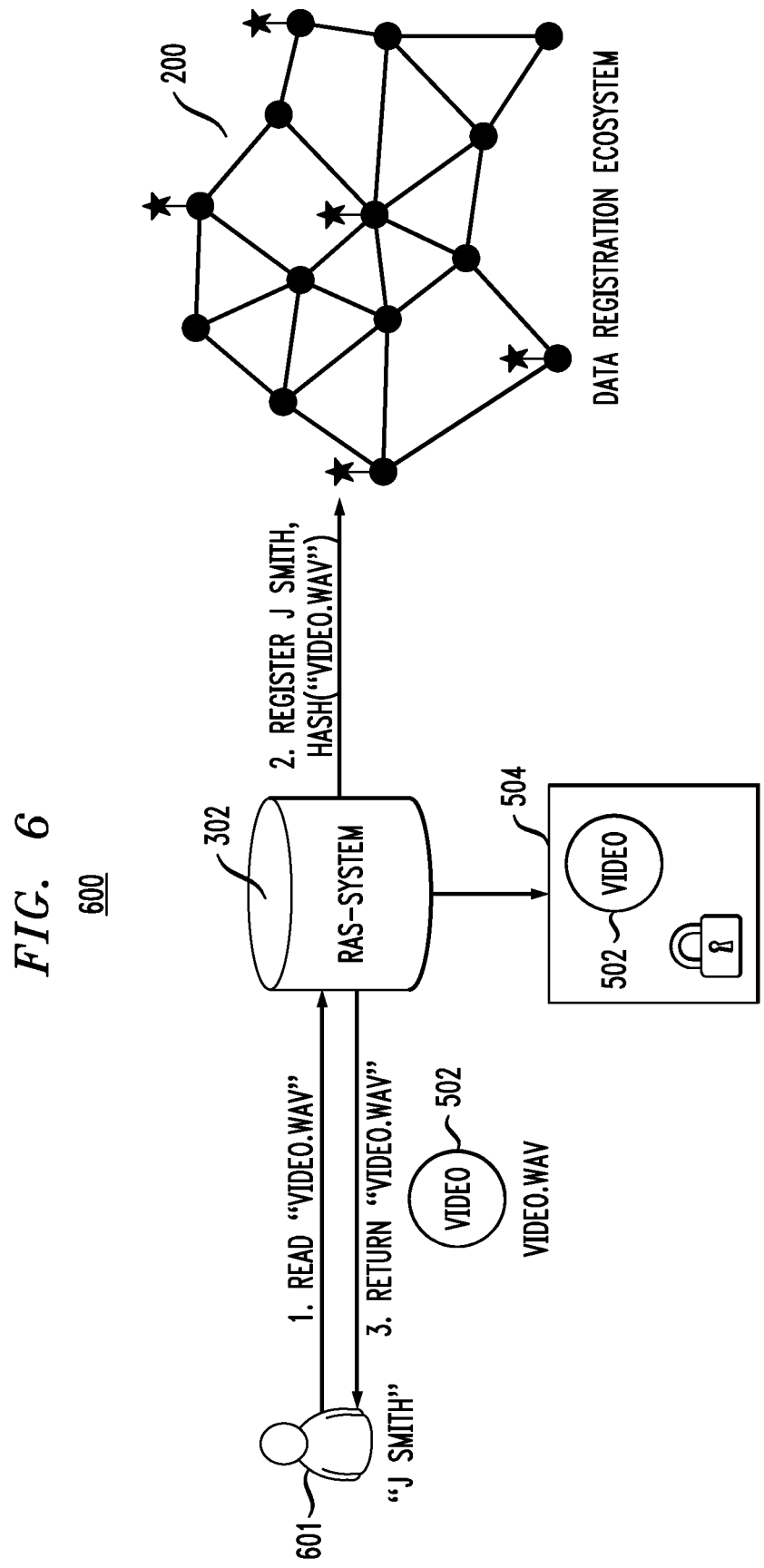
FIG. 6 illustrates a read request process for registration-aware storage systems, according to an illustrative embodiment.

In a first embodiment as illustrated in process 600 of FIG. 6, the storage-user allows a transfer of video file 502 directly to the requesting user, but mandates that the RAS-System 302 registers that the requesting user issued a read request for the data.

For example, as shown, requesting user "j smith" 601 sends from his client device a read request for video file 502 to RAS-System 302. RAS-System 302 registers with the data registration ecosystem 200 that "j smith" requested video file 502. Then, RAS-System 302 returns the video file 502 to the requesting user 601. Again, it is assumed that the storage-user 301 included a permission attribute in his/her identity token file that allows "j smith" to access video file 502.

Figure 7:
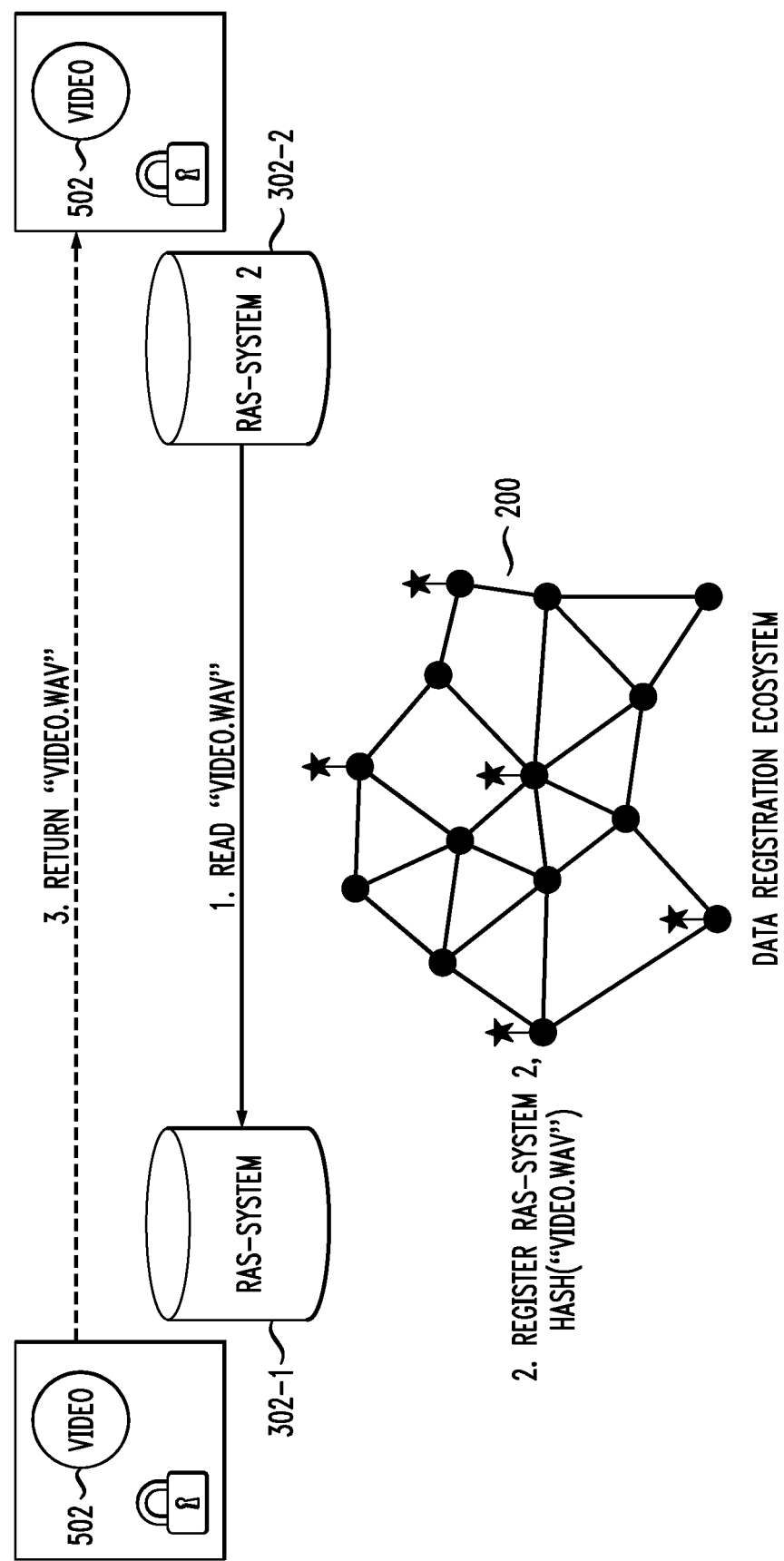
FIG. 7 illustrates a read request process for registration-aware storage systems, according to another illustrative embodiment.

In a second embodiment as illustrated in process 700 of FIG. 7, the storage-user disallows direct transfers to authorized users and only allows transfers to storage systems that are registration-aware. Again, this can be specified in the storage-user's token file as a permission attribute.

Thus, as shown in FIG. 7, RAS-System 302-2 issues a read request to RAS-System 302-1 for video file 502. RAS-System 302-1 registers the read request made by RAS-System 302-2 with data registration ecosystem 200, and then returns the video file 502 to RAS-System 302-2. The assumption is that RAS-System 302-2 also has the capabilities to enforce the registration-aware policies dictated by the storage-user's identity.

When the storage-user (or perhaps any other public entity) wishes to create a chain-of-custody map for a given piece of content, they can locate the first registration of the content in the data registration ecosystem 200, the first storage of that content on a registration-aware storage system 302 (as evidenced by the public key signature of that system), any reads of that content by specific users (e.g., 601), and/or any transfers of that content to other registration-aware systems (e.g., 302-2).

Figure 8:
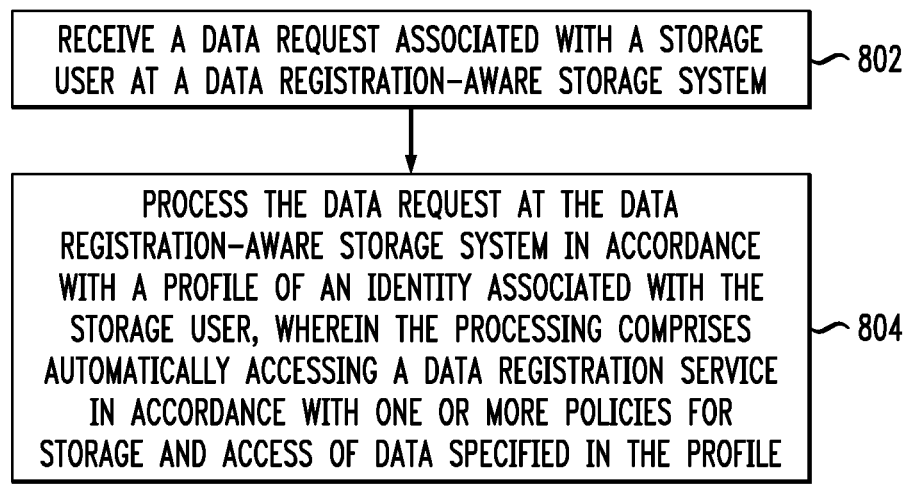
FIG. 8 illustrates a method for providing data registration-aware storage, according to an illustrative embodiment.

FIG. 8 illustrates a methodology 800 for providing data registration-aware storage, according to an illustrative embodiment.

In step 802, a data request associated with a storage user is received at a data registration-aware storage system.

In step 804, the data request is processed at the data registration-aware storage system in accordance with a profile of an identity associated with the storage user. The processing comprises automatically accessing a data registration service in accordance with one or more policies for storage and access of data specified in the profile.

At least portions of the system and methods for providing data registration-aware storage shown in FIGS. 1-8 may be implemented using one or more processing platforms associated with one or more information processing systems. In some embodiments, a given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one. In many embodiments, logic may be executed across one or more physical or virtual processors. In certain embodiments, a virtual processor may be mapped to and executed on or across a portion of one or more virtual or physical processors.

As is apparent from the above, one or more of the processing modules or other components of the system and method for providing data registration-aware storage shown in FIGS. 1-8 may each run on a computer, server, storage device or other processing platform element. A given such element may be viewed as an example of what is more generally referred to herein as a "processing device." An example of such a processing platform is processing platform 900 shown in FIG. 9.

The processing platform 900 in this embodiment comprises a plurality of processing devices, denoted 902-1, 902-2, 902-3, . . . 902-N, which communicate with one another over a network 904.

The network 904 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

As mentioned previously, some networks utilized in a given embodiment may comprise high-speed local networks in which associated processing devices communicate with one another utilizing Peripheral Component Interconnect Express (PCIe) cards of those devices, and networking protocols such as InfiniBand, Gigabit Ethernet or Fibre Channel.

The processing device 902-1 in the processing platform 900 comprises a processor 910 coupled to a memory 912.

The processor 910 may comprise a microprocessor, a microcontroller, an application-specific integrated circuit (ASIC), a field-programmable gate array (FPGA) or other type of processing circuitry, as well as portions or combinations of such circuitry elements.

The memory 912 may comprise random access memory (RAM), read-only memory (ROM) or other types of memory, in any combination. The memory 912 and other memories disclosed herein should be viewed as illustrative examples of what are more generally referred to as "processor-readable storage media" storing executable program code of one or more software programs.

Articles of manufacture comprising such processor-readable storage media are considered embodiments of the present disclosure. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Figure 9:
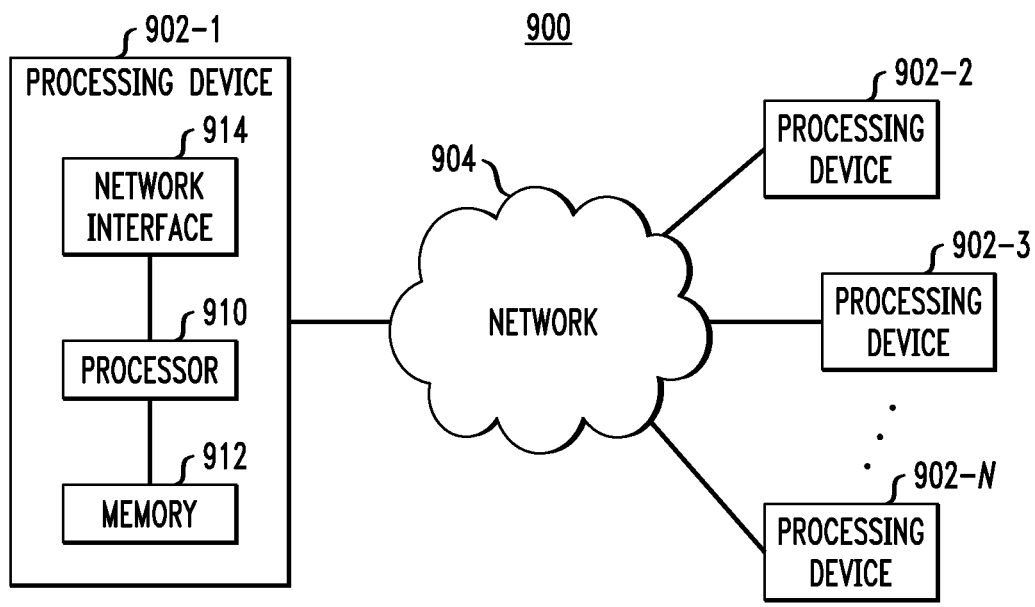
FIG. 9 illustrates a processing platform used to implement data registration-aware storage systems and methods, according to an illustrative embodiment.

Also included in the processing device 902-1 of the example embodiment of FIG. 9 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, this particular processing platform is presented by way of example only, and other embodiments may include additional or alternative processing platforms, as well as numerous distinct processing platforms in any combination, with each such platform comprising one or more computers, servers, storage devices or other processing devices.

For example, other processing platforms used to implement embodiments of the disclosure can comprise different types of virtualization infrastructure, in place of or in addition to virtualization infrastructure comprising virtual machines. Such virtualization infrastructure illustratively includes container-based virtualization infrastructure configured to provide Docker containers or other types of Linux containers (LXCs).

The containers may be associated with respective tenants of a multi-tenant environment of the system and method for providing data registration-aware storage, although in other embodiments a given tenant can have multiple containers. The containers may be utilized to implement a variety of different types of functionality within the system. For example, containers can be used to implement respective cloud compute nodes or cloud storage nodes of a cloud computing and storage system. The compute nodes or storage nodes may be associated with respective cloud tenants of a multi-tenant environment. Containers may be used in combination with other virtualization infrastructure such as virtual machines implemented using a hypervisor.

As another example, portions of a given processing platform in some embodiments can comprise converged infrastructure such as VxRail™, VxRack™ or Vblock® converged infrastructure commercially available from VCE, the Virtual Computing Environment Company, now the Converged Platform and Solutions Division of Dell EMC. For example, portions of a value-based governance system of the type disclosed herein can be implemented utilizing converged infrastructure.

It should therefore be understood that in other embodiments different arrangements of additional or alternative elements may be used. In many embodiments, at least a subset of these elements may be collectively implemented on a common processing platform, or each such element may be implemented on a separate processing platform.

Also, in other embodiments, numerous other arrangements of computers, servers, storage devices or other components are possible in the system and method for providing data registration-aware storage. Such components can communicate with other elements of the system over any type of network or other communication media.

As indicated previously, in some embodiments, components of the system and method for providing data registration-aware storage as disclosed herein can be implemented at least in part in the form of one or more software programs stored in memory and executed by a processor of a processing device. For example, at least portions of the execution environment or other system components are illustratively implemented in one or more embodiments the form of software running on a processing platform comprising one or more processing devices.

It should again be emphasized that the above-described embodiments of the disclosure are presented for purposes of illustration only. Many variations and other alternative embodiments may be used. For example, the disclosed techniques are applicable to a wide variety of other types of systems and method for providing data registration-aware storage. Also, the particular configurations of system and device elements, associated processing operations and other functionality illustrated in the drawings can be varied in other embodiments. Moreover, the various assumptions made above in the course of describing the illustrative embodiments should also be viewed as exemplary rather than as requirements or limitations of the embodiments. Numerous other alternative embodiments within the scope of the appended claims will be readily apparent to those skilled in the art.

What is claimed is:

1. A method comprising:
configuring one or more data storage systems to automatically access a data registration service in response to receipt of a data request associated with a storage user of the one or more data storage systems and a profile of an identity associated with the storage user;
at least one of the one or more data storage systems receiving a query from the storage user seeking to discover data registration capabilities of the at least one data storage system; and
the one or more data storage systems returning to the storage user an indication of data registration capabilities of the at least one data storage system;
wherein the profile of the identity associated with the storage user comprises one or more policies for storage and access of data associated with the storage user, wherein the one or more policies of the identity profile comprise one or more user selections set by the storage user with respect to storage, access, and data registration of data associated with the storage user;
at least one of the one or more data storage systems receiving a write request from the storage user for a given data set;
the at least one data storage system performing the write request for the given data set and automatically accessing the data registration service in accordance with the one or more policies in the profile of the identity of the storage user;

wherein the at least one data storage system registers the given data set with the data registration service by one of:
acting as a proxy for the storage user by providing an identity of the at least one data storage system and the content address of the given data set such that the identity of the storage system is associated with the given data set by the data registration service; and
receiving a signed data registration request from the storage user along with the write request and forwarding the signed registration request to the data registration service such that the identity of the storage user is associated with the given data set by the data registration service; and
wherein the identity of the storage user is a decentralized identity established between the storage user and a decentralized identity management system.

2. The method of claim 1, wherein the indication of capabilities returned by the at least one data storage system to the storage user further comprises trust-based capabilities.

3. The method of claim 1, further comprising creating a chain of custody for the given data set based on the identities associated with the given data set.

4. The method of claim 1, further comprising, when the data registration service fails, the at least one data storage system requests one of:
undoing the write operation and returning a write operation error message to the storage user; and
completing the write operation and returning a message that the write operation was successful but that the data registration service failed.

5. The method of claim 1, further comprising at least one of the one or more data storage systems receiving a read request from a user for a given data set.

6. The method of claim 5, further comprising the at least one data storage system performing the read request for the given data set and automatically accessing the data registration service in accordance with the one or more policies in the identity profile of the storage user.

7. The method of claim 6, wherein, when the user is an individual, the data registration service associates the individual and the read request with the given data set thereby creating a chain of custody for the given data set.

8. The method of claim 6, wherein, when the user is a data storage system, the data registration service associates the data storage system and the read request with the given data set thereby creating a chain of custody for the given data set.

9. The method of claim 1, wherein the decentralized identity management system is a blockstack-based system comprising a blockchain distributed ledger.

10. A system comprising at least one processor, coupled to a memory, and configured to perform the step of claim 1.

11. A computer program product comprising a non-transitory processor-readable storage medium having stored therein program code of one or more software programs, wherein the program code when executed by at least one processing device causes said at least one processing device to:
configure one or more data storage systems to automatically access a data registration service in response to receipt of a data request associated with a storage user of the one or more data storage systems and a profile of an identity associated with the storage user;
at least one of the one or more data storage systems receiving a query from the storage user seeking to discover data registration capabilities of the at least one data storage system; and
the one or more data storage systems returning to the storage user an indication of data registration capabilities of the at least one data storage system;
wherein the profile of the identity associated with the storage user comprises one or more policies for storage and access of data associated with the storage user, wherein the one or more policies of the identity profile comprise one or more user selections set by the storage user with respect to storage, access, and data registration of data associated with the storage user;
at least one of the one or more data storage systems receiving a write request from the storage user for a given data set;
the at least one data storage system performing the write request for the given data set and automatically accessing the data registration service in accordance with the one or more policies in the profile of the identity of the storage user;
wherein the at least one data storage system registers the given data set with the data registration service by one of:
acting as a proxy for the storage user b providing an identity of the at least one data storage system and the content address of the given data set such that the identity of the storage system is associated with the given data set by data registration service; and
receiving a signed data registration request from the storage user along with the write request and forwarding the signed registration request to the data registration service such that the identity of the storage user is associated with the given data set by the data registration service; and
wherein the identity of the storage user is a decentralized identity established between the storage user and a decentralized identity management system.

12. The computer program product of claim 11 further comprising, when the data registration service fails, the at least one data storage system requests one of:
undoing the write operation and returning a write operation error message to the storage user; and
completing the write operation and returning a message that the write operation was successful but that the data registration service failed.

13. The computer program product of claim 11 further comprising at least one of the one or more data storage systems receiving a read request from a user for a given data set.

14. A method comprising:
receiving a data request associated with a storage user at a data registration-aware storage system; and
processing the data request at the data registration-aware storage system in accordance with a profile of an identity associated with the storage user, wherein the processing comprises automatically accessing a data registration service in accordance with one or more policies for storage and access of data specified in the profile;
at least one of one or more data storage systems receiving a query from the storage user seeking to discover data registration capabilities of at least one data storage system; and
the one or more data storage systems returning to the storage user an indication of data registration capabilities of the at least one data storage system, wherein the one or more policies of the identity profile comprise one or more user selections set by the storage user with respect to storage; access, and data registration of data associated with the storage user;

at least one of the one or more data storage systems receiving a write request from the storage user for a Given data set;

the at least one data storage system performing the write request for the given data set and automatically accessing the data registration service in accordance with the one or more policies in the profile of the identity of the storage user;

wherein the at least one data storage system registers the given data set with the data registration service by one of:

acting as a proxy for the storage user by providing an identity of the at least one data storage system and the content address of the given data set such that the identity of the storage system is associated with the given data set by the data registration service; and receiving a signed data registration request from the storage user along with the write request and forwarding the signed registration request to the data registration service such that the identity of the storage user is associated with the given data set by the data registration service; and wherein the identity of the storage user is a decentralized identity established between the storage user and a decentralized identity management system.

15. The method of claim 14, wherein the indication of capabilities returned by the at least one data storage system to the storage user further comprises trust-based capabilities.

16. The method of claim 14 further comprising, when the data registration service fails, the at least one data storage system requests one of:

undoing the write operation and returning a write operation error message to the storage user; and completing the write operation and returning a message that the write operation was successful but that the data registration service failed.

17. A system comprising:

one or more data storage systems;

wherein at least one of the one or more data storage systems is configured to receive a data request associated with a storage user;

process the data request in accordance with a profile of an identity associated with the storage user, wherein the processing comprises automatically accessing a data registration service in accordance with one or more policies for storage and access of data of the storage user specified in the profile;

at least one of the one or more data storage systems receives a query from the storage user seeking to discover data registration capabilities of the at least one data storage system; and the one or more data storage systems returning to the storage user an indication of data registration capabilities of the at least one data storage system, wherein the one or more policies of the identity profile comprise one or more user selections set by the storage user with respect to storage, access, and data registration of data associated with the storage user;

at least one of the one or more data storage systems receiving a write request from the storage user for a given data set;

the at least one data storage system performing the write request for the given data set and automatically accessing the data registration service in accordance with the one or more policies in the profile of the identity of the storage user;

wherein the at least one data storage system registers the given data set with the data registration service by one of;

acting as a proxy for the storage user by providing an identity of the at least one data storage system and the content address of the given data set such that the identity of the storage system is associated with the given data set by the data registration service; and receiving a signed data registration request from the storage user along with the write request and forwarding the signed registration request to the data registration service such that the identity of the storage user is associated with the given data set by the data registration service; and wherein the identity of the storage user is a decentralized identity established between the storage user and a decentralized identity management system.

18. The system of claim 17 further comprising, when the data registration service fails, the at least one data storage system requests one of:

undoing the write operation and returning a write operation error message to the storage user; and completing the write operation and returning a message that the write operation was successful but that the data registration service failed.

19. The system of claim 17 further comprising at least one of the one or more data storage systems receiving a read request from a user for a given data set.

20. The system of claim 19 further comprising the at least one data storage system performing the read request for the given data set and automatically accessing the data registration service in accordance with the one or more policies in the identity profile of the storage user.

* * * * *

UNITED STATES PATENT AND TRADEMARK OFFICE
CERTIFICATE OF CORRECTION

PATENT NO. : 10,841,079 B1  
APPLICATION NO. : 15/660411  
DATED : November 17, 2020  
INVENTOR(S) : Stephen Todd et al.

Page 1 of 1

It is certified that error appears in the above-identified patent and that said Letters Patent is hereby corrected as shown below:

In the Claims

Claim 11, Column 14, Line 23 please delete "user b" and insert therefor --user by--

Signed and Sealed this  
Twenty-ninth Day of December, 2020

Andrei Iancu  
*Director of the United States Patent and Trademark Office*